United States Patent [19]

Visser

[11] Patent Number: 4,596,172
[45] Date of Patent: Jun. 24, 1986

[54] LUMBER CUTTING SAW

[75] Inventor: James T. Visser, Ada, Mich.

[73] Assignee: Oliver Machinery Company, Grand Rapids, Mich.

[21] Appl. No.: 693,620

[22] Filed: Jan. 22, 1985

Related U.S. Application Data

[62] Division of Ser. No. 489,837, Apr. 29, 1983, abandoned.

[51] Int. Cl.$^4$ ............... B27B 5/02; B27B 25/02
[52] U.S. Cl. ............................ 83/71; 83/210; 83/367; 83/371; 83/403.1
[58] Field of Search ............. 83/403.1, 371, 363, 83/367, 263, 71, 209, 210, 364

[56] References Cited

U.S. PATENT DOCUMENTS

| | | | |
|---|---|---|---|
| 2,828,917 | 4/1958 | Wheeler et al. | 33/142 X |
| 2,869,788 | 1/1959 | Turner | 364/564 |
| 2,885,787 | 5/1959 | Gray et al. | 33/141 B |
| 3,013,459 | 12/1961 | Coleman | 83/365 X |
| 3,120,861 | 2/1964 | Finlay et al. | 83/365 X |
| 3,191,857 | 6/1965 | Galey et al. | 234/3 |
| 3,246,550 | 4/1966 | Galey et al. | 83/56 |
| 3,260,378 | 7/1966 | Jackson | 83/71 X |
| 3,329,181 | 7/1967 | Buss et al. | 83/371 X |
| 3,381,729 | 5/1968 | Dunn | 144/376 |
| 3,466,958 | 9/1969 | Munson | 83/364 X |
| 3,550,279 | 12/1970 | Fapiano | 33/141 L |
| 3,562,918 | 2/1971 | Ertman et al. | 33/174 L |
| 3,780,777 | 12/1973 | Davies. | |
| 3,811,353 | 5/1974 | Miles | 83/71 |
| 3,848,646 | 11/1974 | Miles | 83/371 X |
| 3,941,019 | 3/1976 | Baldwin et al. | 83/71 |
| 3,960,041 | 6/1976 | Warren | 83/71 X |
| 4,260,877 | 4/1981 | Conway | 33/124 X |
| 4,384,339 | 5/1983 | Rokhman | 377/24 |
| 4,445,411 | 5/1984 | Purcell | 83/403.1 |

Primary Examiner—James M. Meister
Attorney, Agent, or Firm—Price, Heneveld, Huizenga & Cooper

[57] ABSTRACT

The specification discloses an optimizing saw including a scanner unit having devices for measuring both the width and length of boards passing through the station whereby board feet can be calculated. More specifically, the width measuring device includes a reference plane and a reciprocating ram opposite the reference plane which engages a board therebetween to measure board width. The optimizing saw further includes a board conveying apparatus having a multi-speed hydraulic motor drive for smoothly and precisely transporting boards through the optimizing saw. Optimal saw cut locations for each board, control of the width-measuring device, calculation of board feet processed, pinch roll actuation, conveyor acceleration, conveyor deceleration, and status of current production against a predetermined bill of materials are all controlled by a single microprocessor.

3 Claims, 10 Drawing Figures

LUMBER CUTTING SAW

BACKGROUND OF THE INVENTION

This is a division of application Ser. No. 489,837, filed Apr. 29, 1983 now abandoned.

The present invention relates to wood processing equipment, and more particularly to lumber defecting saws.

In some saw mill applications, where high-quality lumber is to be sorted and shipped, it is necessary to remove defects, such as knots, checks, or other imperfections, from the boards and to optimize and cut clear lumber according to a bill of materials. Defecting can be done manually by an operator who simply cuts the defects out using a manually operated saw. A more preferable method of removing defects and optimizing is to employ an automatically operated saw known in the art as an optimizing saw, which detects marks placed on a board adjacent a defect and automatically responds to these position-indicating marks to make cuts in front of and behind the defect, removing the undesired portion of the board and to cut the clear lumber to optimized lengths. Examples of known defecting and optimizing saws are illustrated in U.S. Pat. No. 3,780,777, issued Dec. 25, 1973, to Davies, entitled DEFECTING SAW; and U.S. Pat. No. 3,941,019, issued Mar. 2, 1976, to Baldwin et al, entitled METHOD AND APPARATUS FOR CUTTING LUMBER AND THE LIKE.

Typically, optimizing saws include a scanning station, a sawing station, a conveyor for transporting lumber sequentially through the scanning station and the sawing station, and control equipment such as microprocessors to calculate the optimum location of saw cuts, to control the movement of the lumber on the conveyor, and to actuate the saw. Prior to being run through the optimizing saw, each board is manually inspected by an operator, who uses a fluorescent crayon to mark the opposite sides of each defect to be removed from the board. As the marked lumber is run through the saw, the marks are detected at the scanning station and their locations from the beginning of the board are stored, for example in a microprocessor or other digital device. After clearing the scanning station, the board then passes through the sawing station wherein the lumber is stopped at each required cut location and cut. Consequently, as the lumber is run through the saw, each defect is removed and clear lumber is optimally cut at the sawing station. Known optimizing saws, as illustrated in the above noted patents, are not without their drawbacks.

First, electric motors are utilized to power the lumber-conveying apparatus. Primarily, two types of electric motors have been used. The first type is an electric clutch and brake motor, which rapidly decelerates the lumber to stop at a cut location for cutting and then rapidly accelerates the board to the next location to be cut. However, the friction linings within such a motor wear excessively under the constant and repetitive high-torque force of rapid deceleration and acceleration required to convey lumber through the saw at the desired rate. A second type of motor previously utilized is a DC servomotor. Although these motors overcome the wear problems associated with clutch and brake motors, the servomotors require complex circuitry and relatively frequent and highly technical adjustments to maintain their accurate operability. Therefore, electric motors previously utilized for transporting the lumber through optimizing saws have been relatively complex and/or subject to excessive down time for repair and adjustment.

Second, although known optimizing saws include highly accurate scanning devices for detecting the length of each board and the position of the fluorescent crayon marks, the saws are capable of determining only the length or longitudinal dimension of boards passing through the scanner. Consequently, calculating board feet within boards passing through the scanner is impossible. It is therefore necessary in the art to run boards having only a known width through the lumbering saw on any one particular run wherein the board feet within the lumber is a function only of board length. This method does not permit multiple width boards to be processed on a single run, and further does not detect the presence of improperly dimensioned boards on a particular run. The processing of variable width boards on a single run, although extremely desirable, has not been possible in previous optimizing saws.

SUMMARY OF THE INVENTION

The aforementioned problems are solved by the present invention. In a first aspect of the invention, the scanning station is provided with a unique measuring device for determining the width of boards conveyed through the optimizing saw. More particularly, the width-determining device includes a reference surface or fence against which one side of the lumber rides while conveyed through the scanning station. Further included is a ram and head mounted for reciprocable movement generally transverse across the board travel path toward and away from the reference surface. As each board passes through the scanner, the ram head is extended toward the fence until the head engages the board riding along the fence. The width calculation device further includes a motion measuring mechanism, such as a shaft encoder, for measuring the travel of the ram head to the point the head engages the board so that the width of the board can then be calculated as the distance between the ram head and fence. Consequently, the scanner station is capable of measuring the width of boards traveling through the scanner, and also the board thickness if a second measurement device is provided. With such measurements, the scanner is further capable of calculating the board feet within each board and the total of all boards passing through the scanner unit.

In a second aspect of the invention, the board transportation mechanism for conveying lumber through the sawing station is driven by a multi-speed hydraulic motor. More particularly, the driving mechanism includes a board engagement mechanism such as a pair of pinch rollers, a hydraulic motor drivingly coupled to the board engagement mechanism, a source of pressurized hydraulic fluid, and controllable delivery means for delivering the hydraulic fluid to the motor at a variety of volumes to effect multi-speed operation. The delivery system includes at least three fluid conveying loops coupled in parallel with each other to provide fluid to the motor, each loop including a valve for selectively interrupting the fluid flow therethrough. Therefore, the speed at which the transportation mechanism conveys lumber through the sawing station is controlled by selective actuation of the separate valves. The boards are conveyed at a relatively rapid rate when the next cut location is relatively far from the saw element. On the other hand, the drive mechanism is capable of smoothly decelerating the board through selective valve actuation to precisely position each cut location for cutting. The selective actuation of the hydraulic control valves is controlled by software in the same microprocessor control unit that calculates the optimum cutting schedule, controls pinch roll actuation, determines width measurements, and calculates board feet. The problems of friction lining wear associated with clutch and brake motors and the problems of complex circuitry and technical adjustments required for DC servomotors are eliminated.

These and other objects, advantages, and features of the invention will be more readily understood and appreciated by reference to the specification and drawings.

DETAILED DESCRIPTION OF THE PREFERRED EMBODIMENT

An optimizing saw constructed in accordance with a preferred embodiment of the invention is illustrated in the drawings and generally designated 10. The saw (FIGS. 1 and 2) includes saw unit 12, scanner unit 14, and conveyor or conveying means 16 for transporting boards sequentially to the scanner unit and the saw unit. Microprocessor or digital device 18, including keyboard 20 and printer 22 (FIG. 1 only), is included to provide operational control to saw unit 12, scanner unit 14, and conveyor 16. As will be described, scanner unit 14 includes means for detecting fluorescent crayon marks on boards passing through the optimizing saw 10. Microprocessor 18 memorizes the positions of these detected marks and controls saw unit 12 to cut precisely at the location of each required cut. Consequently, defects are removed from the boards by marking each defect on either side thereof with a fluorescent crayon and then processing the board through saw 10 to cut on either side of the defect to remove the undesired portion of the board and cutting clear lumber to desired lengths.

Figure 1:
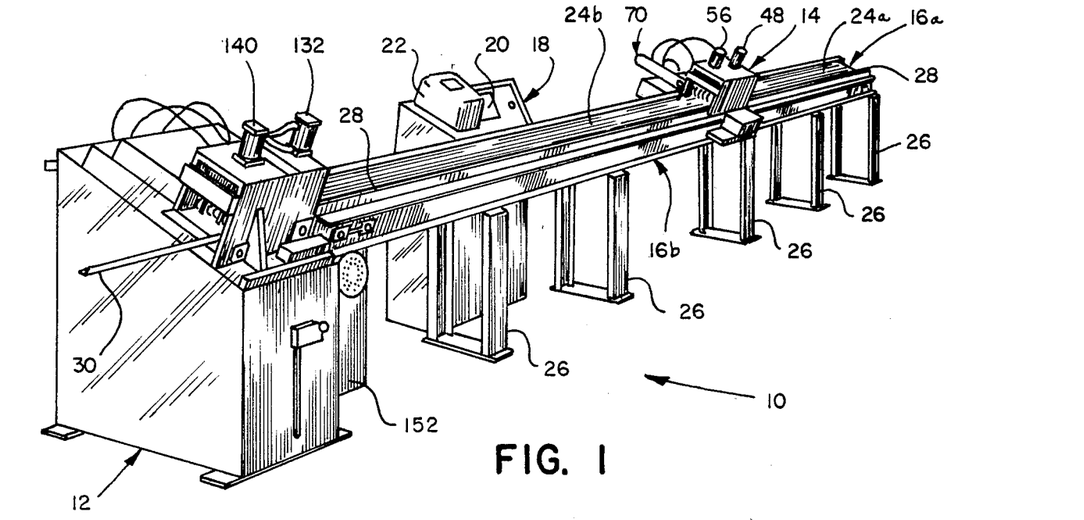
FIG. 1 is a perspective view of the optimizing saw of the present invention.

Turning more specifically to the constructions of the various components of saw 10 and conveyor 16 (FIGS. 1 and 2) will be first described. All lumber passing through saw 10 is loaded onto loading conveyor 16a at the right of the saw as viewed in FIGS. 1 and 2 and is thereafter carried by conveyor 16a to the left sequentially through scanner unit 14, across transfer conveyor 16a, to saw unit 12. Both loading conveyor 16a and transfer conveyor 16b are generally well known to those having ordinary skill in the art and in the preferred embodiment are belt conveyors including driven belts 24a and 24b, respectively (FIG. 1). Conveyors 16 are supported on a plurality of legs 26 and also by saw unit 12 at the conveyors' left-most end. Conveyors 16 are generally parallel to the floor in their longitudinal directions and inclined from the horizontal in their transverse direction. More specifically, each of belts 24 slopes downwardly and forwardly as viewed in FIG. 1 so that lumber traveling on conveyors 16 works downwardly to ride against fence or reference surface 28 as the boards traverse saw 10. Outfeed stock support 30 (FIGS. 1 and 2) optionally extends from saw unit 12 generally in line with fence 28 to provide a support arm for lumber exiting saw 10.

Figure 2:
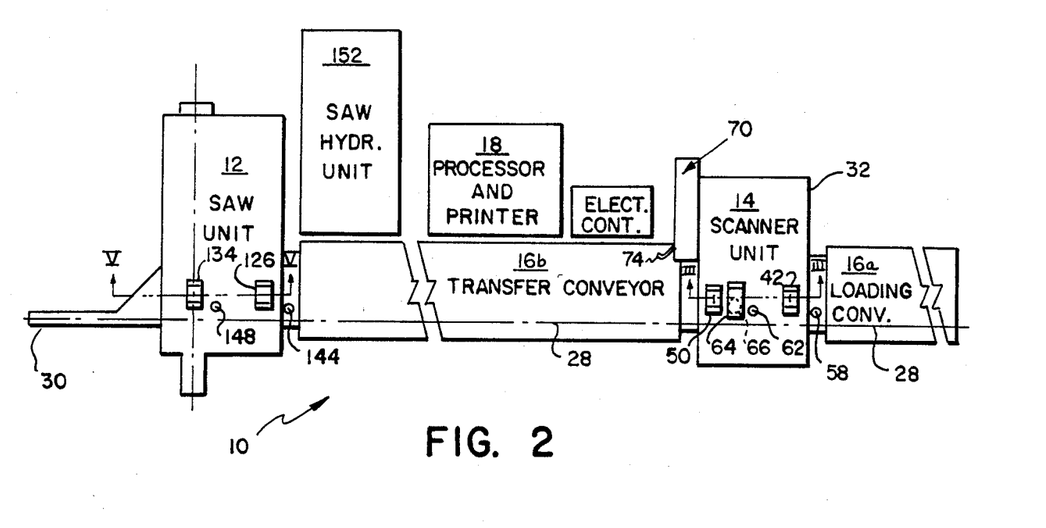
FIG. 2 is a schematic, top plan view of the optimizing saw.
Figure 3:
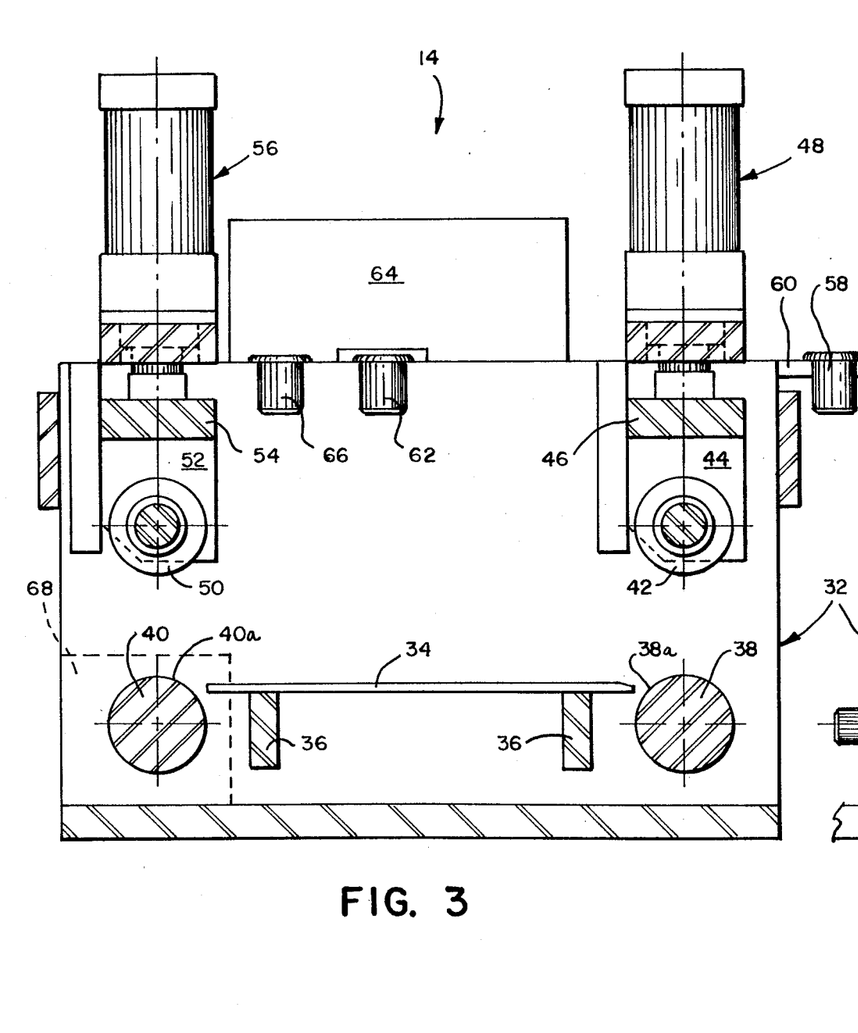
FIG. 3 is a sectional view of the scanner unit taken along plane III—III in FIG. 2.
Figure 4:
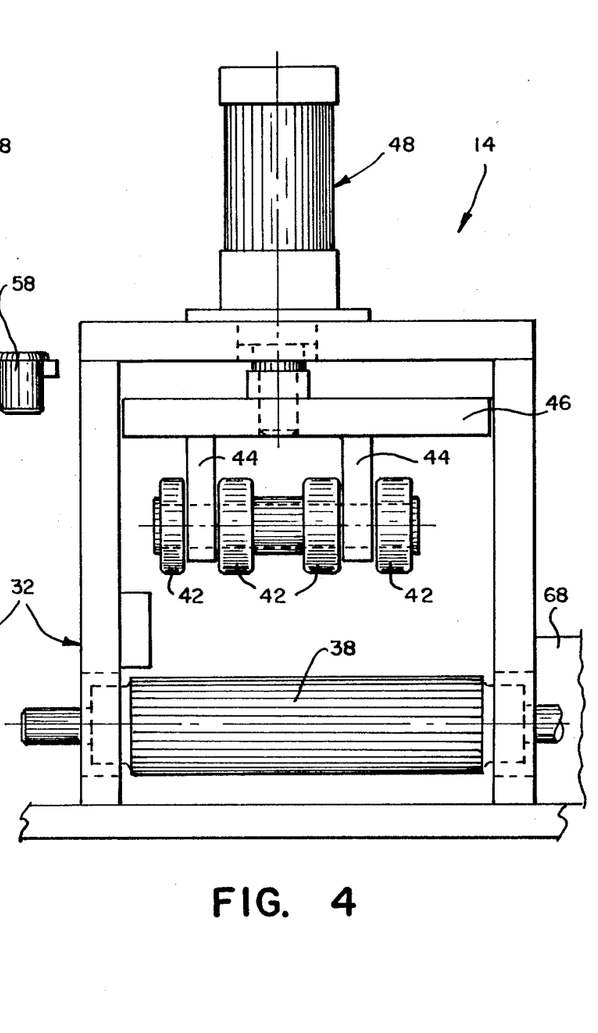
FIG. 4 is an end elevational view of the scanner unit.

Scanner unit 14 (FIGS. 1–4) is most clearly illustrated in FIGS. 3 and 4. The unit includes a housing or frame 32 in which is stationarily supported shelf 34 on supports 36 secured to the housing. Shelf 34 is generally coplanar with belts 24 to support lumber passing through scanner unit 14. Leading and trailing rolls 38 and 40, respectively, are rotatably supported within housing 32 and are generally aligned with shelf 34 to rotatably support lumber passing through scanner 14. Leading pressure roll 42 is rotatably supported on arm 44 extending downwardly from cap 46 which is in turn carried by pneumatic cylinder 48. Consequently, actuation of double-action cylinder 48 reciprocates pressure roll 42 downwardly and upwardly to selectively secure and release a board between support roll 38 and pressure roll 42. Similarly, trailing pressure roll 50 is rotatably supported on arm 52 extending downwardly from cap 54 which is in turn reciprocably carried on pneumatic cylinder 56. Consequently, actuation of double action cylinder 56 causes pressure roll 50 to reciprocate downwardly and upwardly to secure and release a board between support roll 40 and pressure roll 50. Cylinders 48 and 56 are operatively coupled to a source of pneumatic pressure (not shown) and actuated under control of microprocessor 18 in a manner routine to those having ordinary skill in the art.

Scanner unit 14 additionally includes electro-optical equipment to detect the position and presence of boards and fluorescent marks thereon passing through unit 14. Electric eye 58 is supported on flange 60 (see also FIG. 2) to detect the presence of a board directly below the eye. Eye 58 is electrically coupled to microprocessor 18 to provide information regarding board position. Similarly, eye 62 is supported in frame 32 between pressure rolls 42 and 50 to detect the presence of boards directly below the eye and more particularly between the pressure rolls. Scanner 64 including eye 66 is supported on frame 32 to detect fluorescent crayon marks on boards passing through the scanner unit 14 and includes a modulated ultraviolet light source to prevent interference from ambient light. Most preferably, the scanner is that sold by Sick Optik Electronics Inc. of St. Paul, Minn., as model No. LUN 1-2/LUT 1-3. Consequently, eye 66 detects the presence of a fluorescent crayon mark directly therebelow. Shaft encoder 68 is mounted on frame 32, driven by trailing support roll 40, and electrically coupled to processor 18 to provide an indication of the relative position of boards with respect to the support roll. An electric motor (not shown) drivingly engages leading support roll 38 to transport boards through unit 14.

Figure 8:
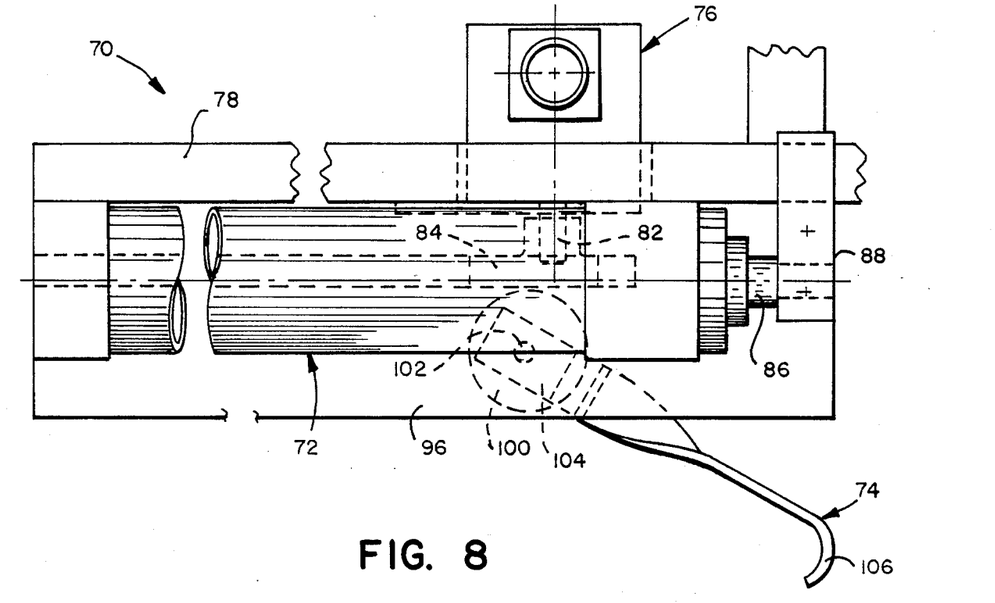
FIG. 8 is a fragmentary, top plan view of the width measuring ram of the scanner unit.
Figure 9:
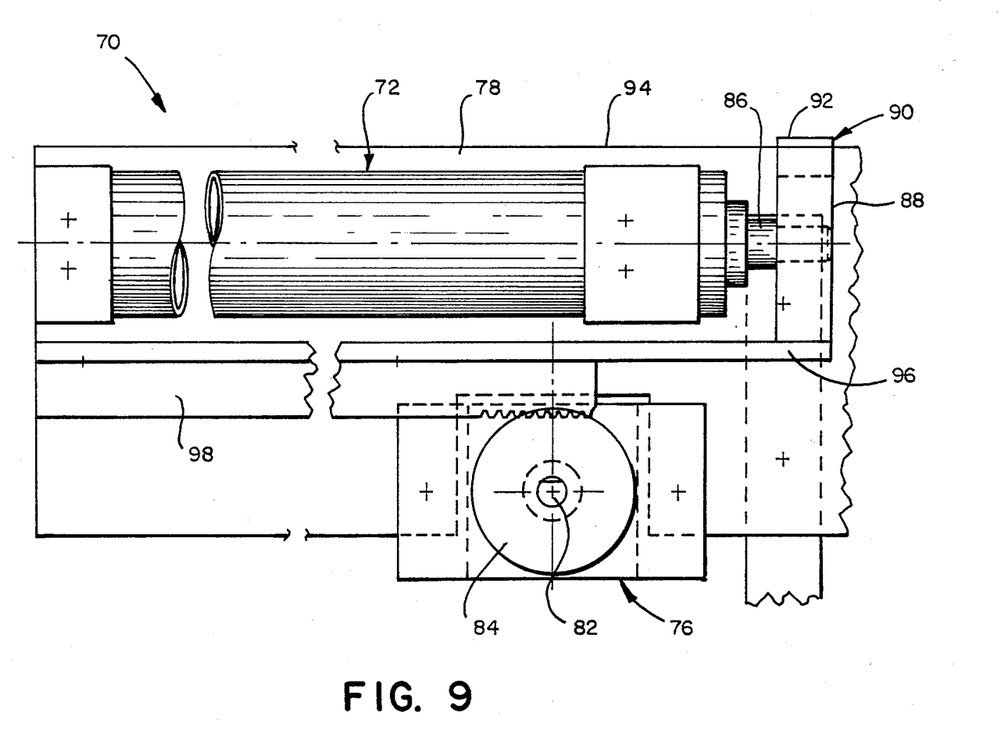
FIG. 9 is a fragmentary, side elevational view of the width measuring ram with the limit switch and finger removed.
Figure 10:
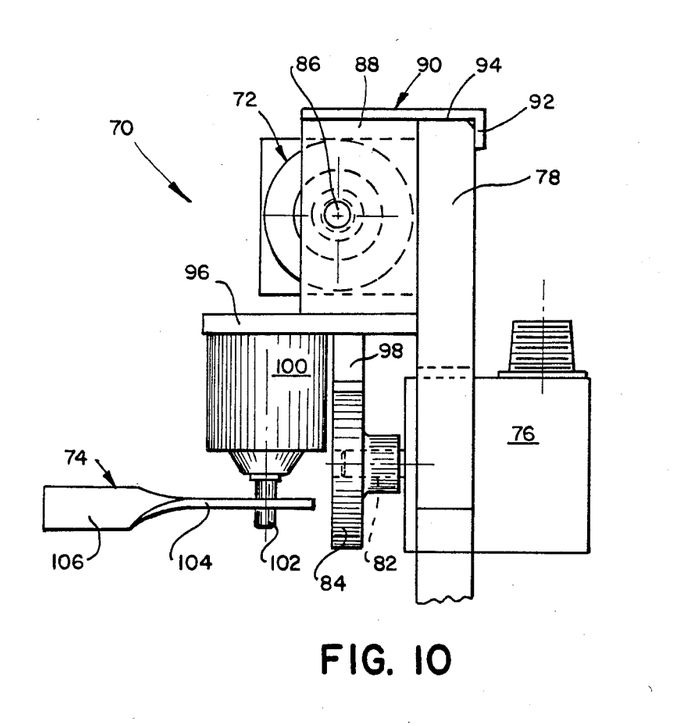
FIG. 10 is an end elevational view of the width measuring ram.

Ram assembly 70 (FIGS. 1, 2, and 8-10) is supported on scanner unit 14 and more particularly on frame 32 to measure the width of each individual board passing through saw 10. The ram is illustrated in greatest detail in FIGS. 8-10, and generally includes pneumatic cylinder 72, feeler or finger 74, and shaft encoder 76. More particularly, ram assembly 70 includes support plate 78 secured to frame 32 of scanner unit 14. Cylinder 72 is supported on plate 78. Also supported on plate 78 is shaft encoder 76, which includes rotatable shaft 82 and pinion 84 supported thereon.

Cylinder 72 (FIGS. 8-10) includes a piston 86 carrying a generally rectangular, planar head 88. Fixedly secured to head 88 is support arm 90 including a hooked end 92 slidingly supported on upper surface 94 of support plate 78. As piston 86 reciprocates within cylinder 72, head 88 is supported throughout its travel by the sliding engagement of arm 90 on plate 78. Also secured to head 88 generally opposite arm 90 is switch support plate 96 oriented generally perpendicularly to support plate 78. Secured to the underside of switch support plate 96 is rack 98 which drivingly engages the outer periphery of pinion 84. Reciprocation of piston 86 within cylinder 72 causes rack 98 to travel with respect to pinion 84 to drive encoder 76 to provide a relative indication of the position of head 88.

Also supported on the undersurface of support plate 96 is rotary microswitch 100 including rotatable shaft 102 which may be angularly shifted to a first state wherein switch 100 is closed from a second "home" state wherein the switch is open. Finger 74 includes mounting portion 104 fixedly secured to shaft 102 and feeler portion 106 extending therefrom. Consequently, deflection of feeler portion 106 to the left as viewed in FIG. 8 will close switch 100. Both encoder 76 and switch 100 are electrically coupled to microprocessor 18. Additionally, double-action pneumatic cylinder 72 is operated under the control of the microprocessor. When piston 86 is extended from cylinder 72, switch 100 will be closed upon relatively light contact of feeler portion 106 of finger 74 with an object such as a board. As most clearly seen in FIG. 2, ram assembly 70 is mounted so that head 88 and finger 74 carried thereby reciprocate in a direction generally transverse to the direction of board travel. Consequently, as boards travel through saw 10 against fence 28, cylinder 72 may be actuated selectively to move head 88 and finger 74 toward the board riding against fence 28. When finger 74 engages the board, switch 100 is closed, indicating to processor 18 that encoder 76 provides an indication of the width of the board.

Figure 5:
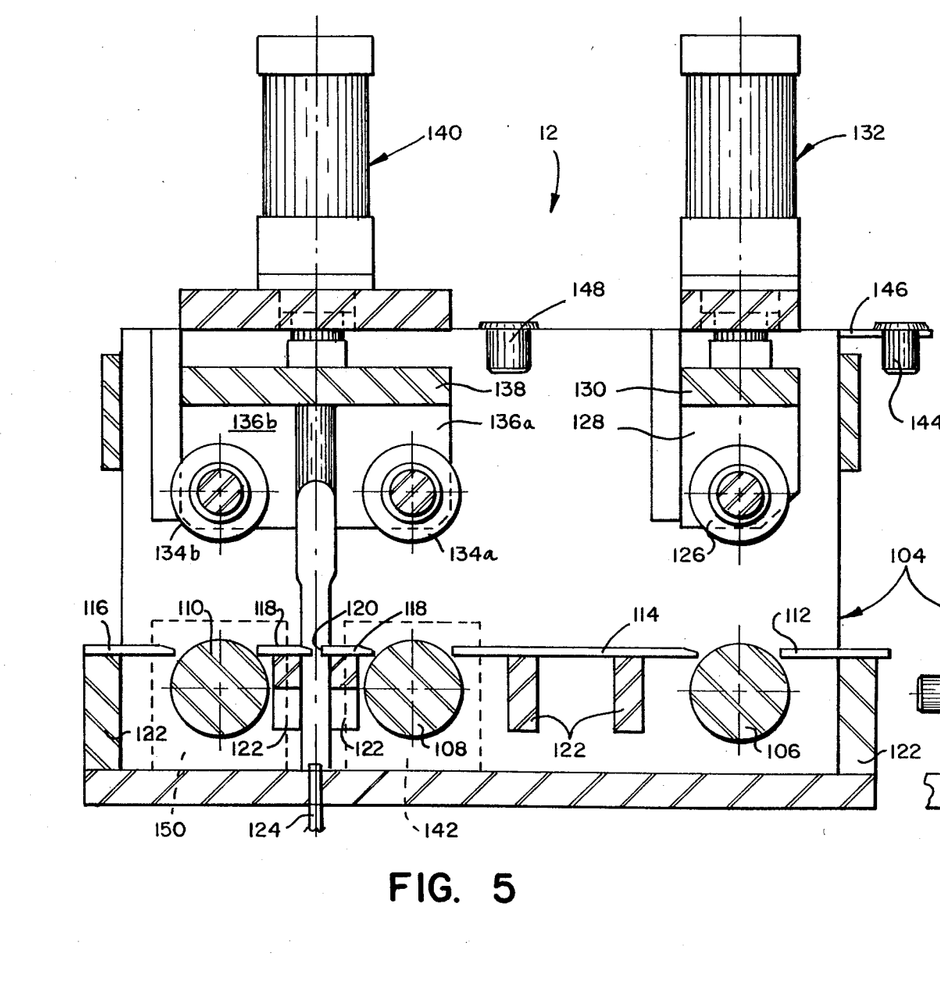
FIG. 5 is a sectional view of the saw unit taken along plane V—V in FIG. 2.
Figure 6:
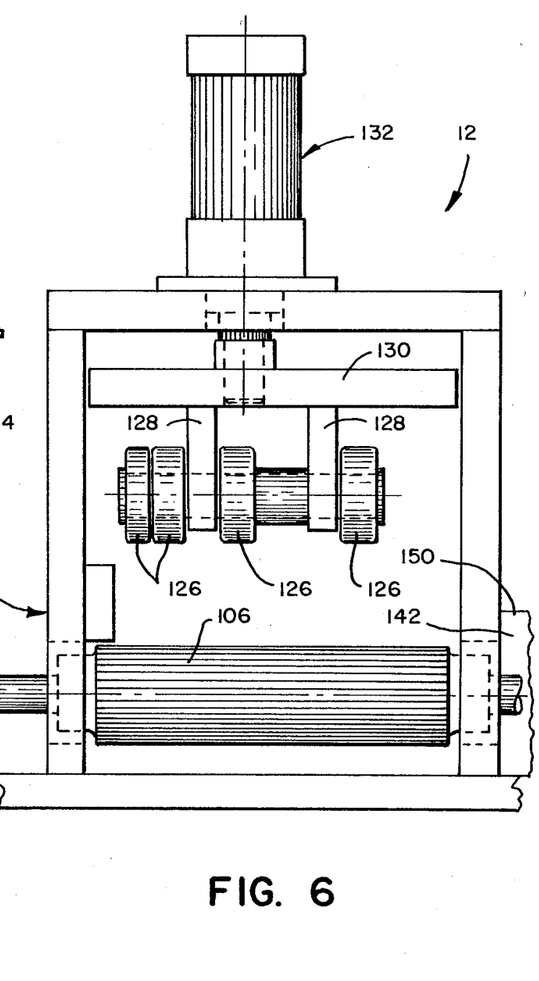
FIG. 6 is an end elevational view of the saw unit.

Saw unit 12 (FIGS. 1, 2, 5, and 6) is most clearly illustrated in FIGS. 5 and 6. Saw unit 12 includes frame 104 within which are rotatably supported leading support roll 106 and trailing support rolls 108 and 110. All of the support rollers are generally coplanar to rotatably support a board passing through saw unit 12. Stationarily supported within frame 104 are shelves 112, 114, and 116 and split anvil 118 defining slot 120 to provide additional board support. All of the shelves and anvils are carried on appropriate supports 122. Saw element 124, for example a circular saw blade, is aligned with slot 120 and is reciprocated upwardly and downwardly through the slot and any boards supported thereon to cut the board in a manner well known in the art. In the preferred embodiment, saw element 124 is reciprocated upwardly and downwardly by a hydraulic cylinder (not shown). Leading pressure roll 126 is rotatably carried on arms 128 extending downwardly from cap 130 which in turn is reciprocably carried on pneumatic cylinder 132. Accordingly, roll 126 may be reciprocated downwardly and upwardly upon actuation of double action cylinder 132 to secure and release a board between support roll 106 and pressure roll 126. Similarly, trailing pressure rolls 134a and 134b are rotatably supported on arms 136a and 136b, respectively, extending downwardly from cap 138 which in turn is reciprocably carried by pneumatic cylinder 140. Cylinders 132 and 140 are operatively coupled to a pneumatic source and operated under the control of processor 18 in a manner well known to those having ordinary skill in the art. Encoder 142 is secured to frame 104 and drivingly engaged by trailing roller 110 to provide an indication of the position of a board with respect to the support roller. Eye 144 is supported on arm 146 to the right of pressure roll 126 to detect the presence of a board directly below the eye. Similarly, eye 148 is supported in frame 104 between pressure rolls 126 and 134a to detect the presence of a board directly below that eye. Eyes 144 and 148 and encoder 142 are all electrically coupled to processor 18 to provide appropriate signals thereto regarding the position of boards traveling through saw 10. All three shaft encoders 68, 76, and 142 are capable of detecting movement accurate to 0.01 inch.

Figure 7:
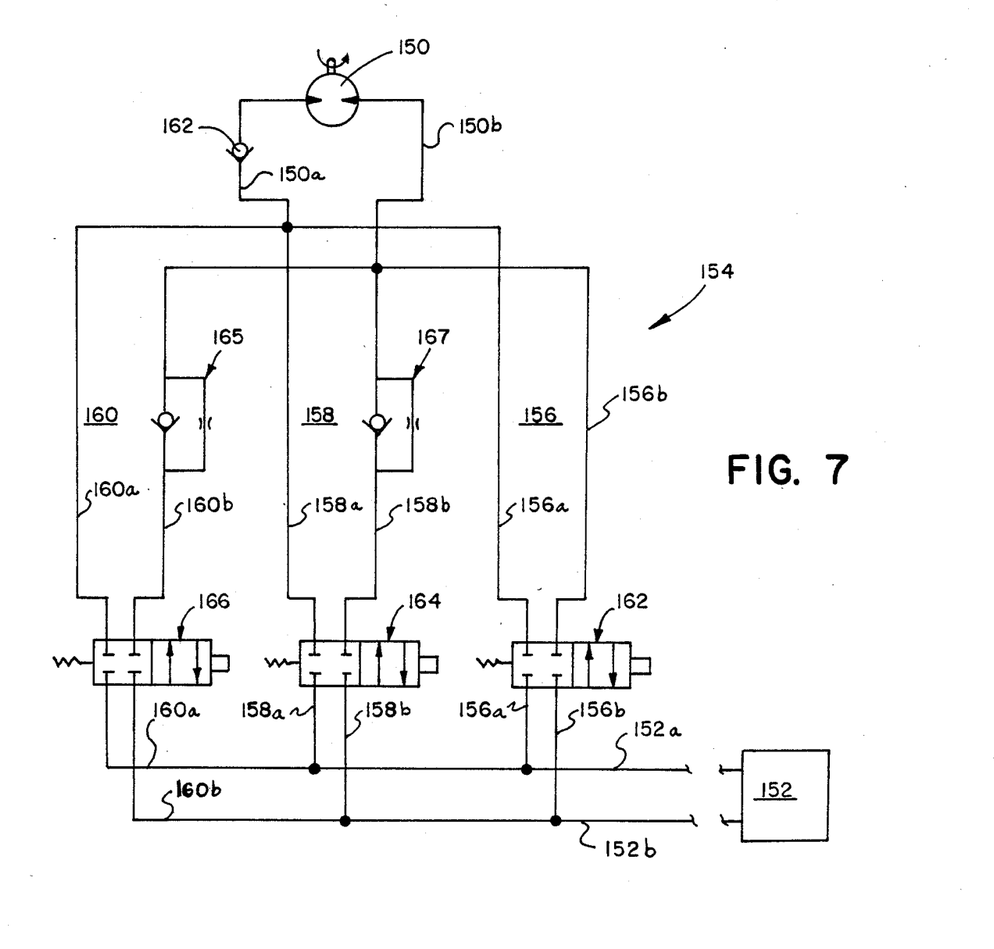
FIG. 7 is a schematic diagram of the hydraulic drive system for the saw unit.

Support rolls 106, 108, and 110 are driven by hydraulic motor 150 (FIGS. 5 and 7) supported on frame 104. The hydraulic motor is powered by a hydraulic source 152 (FIGS. 1, 2, and 5) from which the fluid is delivered through fluid conveying system 154 (FIG. 7). Motor 150, source 152, and system 154 together comprise a motive means for powering conveyor 16. System 154 includes three separate fluid conveying loops 156, 158, and 160 coupled in parallel with one another between hydraulic fluid supply 152 and motor 150. Each of loops 156, 158 and 160 includes a solenoid actuated valve 162, 164, and 166, respectively, shiftable between open and closed positions for allowing and preventing the particular loop from conveying hydraulic fluid. Supply line 152a is fluidly coupled between source 152 and supply lines 156a, 158a, and 160a which are coupled at their opposite ends to motor supply line 150a. Similarly, return line 152b is coupled to each of return lines 156b, 158b, and 160b which are coupled at their opposite ends to motor return line 150b. Check valve 162 and flow control valves 165 and 167 are included in lines 150a, 160b, and 158b, respectively, to provide flow control within the hydraulic system in a manner customary in the art. In the preferred embodiment, hydraulic source 152 also supplies the driving fluid to the saw element cylinder.

All of solenoid valves 162, 164, and 166 are electrically coupled to processor 18 to be controlled thereby. Slow speed using only loop 160 conveys fluid to drive motor 150 at a flow resulting in a board speed of 70 feet per minute. Medium speed using both loops 160 and 158 conveys fluid resulting in a board speed of 140 feet per minute. Fast speed using all three loops 160, 158, and 156 conveys fluid resulting in a board speed of 280 feet per minute.

Operation

A run on saw 10 is initiated by entering the desired bill of material into processor 18 through keyboard 20 (FIG. 1). In the preferred embodiment, processor 18 includes an optimizing algorithm similar to that disclosed in the above identified U.S. Pat. No. 3,941,019. A bill of material including up to ten different desired lengths can be entered on the keyboard, in either English or metric units, as well as the desired quantities of each. Saw 10 is then prepared for board processing by pushing a RUN button on keyboard 20.

An operator then feeds lumber to be optimized onto loading conveyor 16*a* (FIGS. 1 and 2). Prior to loading each individual piece of lumber into saw 10, a mark is made using a fluorescent crayon on the opposite sides of each defect. Marks are also placed at the leading and trailing ends of the board to indicate the desired trim. the marked board loaded on conveyor 16*a* is transported toward scanner unit 14. As the board is transported by belt 24*a*, the board slides or shifts downwardly along the belt into abutting engagement with fence 28 to be longitudinally aligned therewith.

As the leading edge of the board approaches scanner unit 14, eye 58 is tripped or interrupted as the leading edge of the board passes thereunder (FIG. 3). After a predetermined delay sufficient to permit the board to pass between rolls 38 and 42, processor 18 actuates pneumatic cylinder 48 to lower pressure roll 42 to secure the board between the rolls. As the board continues through scanner unit 14, the leading edge of the board will next trip or interrupt eye 62, signaling processor 18 that the leading edge of the board is now a fixed distance from scanner eye 66. After a predetermined delay, sufficient to allow the board to extend between rolls 40 and 50, processor 18 actuates pneumatic cylinder 56 to lower pressure roll 50 to secure the board between the rolls 40 and 50. Continued movement of the board from this point forward drives encoder 68 through rotation of support roll 40 so that microprocessor 18 can effectively monitor the distance between eye 66 and the leading edge of the board to monitor mark location.

As the board progresses through scanner unit 14, the location of crayon marks on the board is calculated by processor 18 with input from eye 66 detecting the presence of crayon marks and input from encoder 68 providing information regarding the position of the board with respect to the scanner (FIG. 3). The location of each crayon mark is recorded in processor memory, and processor 18 insures that an even number of marks are included on each board, i.e., two marks on opposite sides of each defect and one mark at both the beginning and trailing edges of each board. When the board clears eye 62, processor 18 knows that all crayon marks have been detected, and also provides an indication of the total length of the board. Cylinders 48 and 56 are then actuated by processor 18 to lift pressure rolls 42 and 50 in preparation for receiving the next board.

Simultaneously, as scanner 64 is detecting crayon marks on the board, ram assembly 70 (FIGS. 1 and 2) is actuated to measure the board width. Processor 18, actuates cylinder 72 to cause piston 86 to carry head 88 toward the board. As head 88 is extended from assembly 70, rack 98 drives encoder 76 through pinion 84 to provide processor 18 with an indication of the travel and relative position of the head. As head 88 continues toward the board, finger 74 will ultimately engage the board to close switch 100 indicating to processor 18 that the board has been engaged. Because the board rides along fence 28 on slanted conveyor 16, a closing of switch 100 indicates that the distance between head 88 and fence 28 is the width of the board. Processor 18 calculates the board feet within the board once the board length is known when uniform thickness boards are processed. Processor 18 keeps track of the numbers of each type and width board passing through saw 10 on a particular run. Optionally, a second ram assembly similar to 70 can be included if board thickness must also be measured.

After the board clears scanner unit 14, processor 18 computes the optimum number and location of cuts according to a predetermined algorithm to efficiently produce the desired bill of material that has been entered on keyboard 20 prior to the commencement of the run. Processor 18 calculates and stores a "cutting schedule" or list of board positions at which cuts are to be made by saw unit 12.

The board exiting scanner unit 14 then is transported on transfer conveyor 16*b* to saw unit 12. As the board progresses down transfer conveyor 16*b*, eye 144 (FIG. 2) is tripped or interrupted by the leading edge of the board. After a predetermined delay sufficient to allow the board to pass between rolls 106 and 126 (FIG. 5), processor 18 actuates cylinder 132 to lower pressure roll 126 to secure the board between the rolls. The board continues its leftward travel within saw unit 12 and next trips or interrupts eye 148. Again, after a predetermined delay, cylinder 140 is actuated by processor 18 to lower pressure rolls 134 to secure the board between the pressure rolls and support rolls 108 and 110. Thereafter, the position of the board relative to slot 120 can be monitored via encoder 142 driven by support roll 108.

If the first cut to be made is farther than six inches from slot 120 in anvil 118 (FIG. 5), all three valves 162, 164, and 166 (FIG. 7) are opened to drive hydraulic motor 150 to transport the board at approximately 280 feet per minute. When the next fluorescent mark is six inches or less from slot 120, valve 162 is closed to decelerate the speed of the board to approximately 140 feet per minute. When the mark has advanced to within two inches of slot 10, valve 164 is closed by processor 18, slowing the board travel to approximately 70 feet per minute. When the mark has reached slot 120, valve 166 is closed by processor 18 so that the board stops in position. Processor 18 then actuates a lifting mechanism (not shown) to lift rotating saw element 124 (FIG. 5) through slot 120 to cut the board. The saw is then lowered so that the board can be moved to the next cutting location. If the next cut to be made is greater than six inches from slot 120, all three valves 166, 164, and 162 are opened in sequence; if less than six and greater than two inches, valves 166 and 164 are opened in sequence; and if less than two inches, only valve 166 is opened. The above described acceleration and deceleration sequence is continued so that the board is smoothly but rapidly accelerated and decelerated between marks through saw unit 12. After all of the cuts have been made and the trailing edge of the board clears eye 148, processor 18 actuates cylinders 132 and 140 to lift pressure rolls 126 and 134 so that saw unit 12 is prepared for the next board.

Boards are sequentially processed through saw 10 until the predetermined number of boards of each given size in the bill of materials have been produced. At that time, an indicator light is illuminated on processor 18 to signal to the operator that the run is complete. A printout of production can then be printed at this time, or at any other time during the run, on printer 22.

The above description is that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An improved optimizing saw comprising a saw station including a saw element for sawing boards, conveying means for conveying boards through said saw station, said conveying means including motive means for powering said conveying means, wherein the improvement comprises said motive means comprising:

a hydraulic motor;
   a source of pressurized hydraulic fluid;
   controllable delivery means for delivering hydraulic fluid from said source to said motor, said delivery means including valve means for selectively permitting fluid flow therethrough at at least three distinct rates to provide variable speed control for said hydraulic motor to relatively smoothly accelerate and decelerate the boards through said saw station; and
   control means operatively coupled to said valve means for actuating said valve means to smoothly accelerate and decelerate boards to and between cut locations, said control means including means for detecting and recording the location of position-indicating marks on boards, said control means further including means for calculating an optimum cutting schedule based on the locations of the position-indicating marks and a desired bill of materials.

2. An improved optimizing saw as defined in claim 1 further comprising measuring means for determining the position of boards with respect to said saw element, and wherein said control means is further operatively coupled to said measuring means for controlling said valve means responsive to the position of boards with respect to said saw element.

3. An improved optimizing saw as defined in claim 2 wherein said control means comprises a single microprocessor.

* * * * *